March 18, 1958 J. B. O'SHEA 2,826,835
SNOW SHOVEL
Filed June 11, 1953
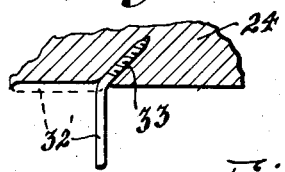
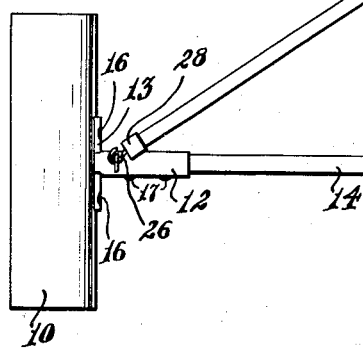
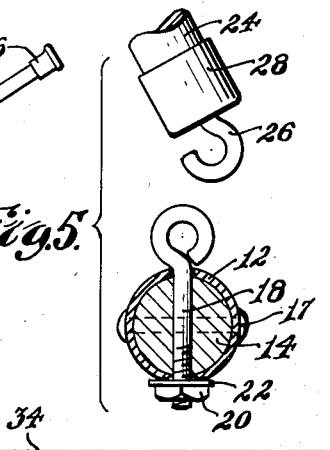
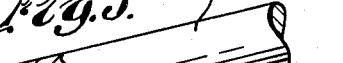
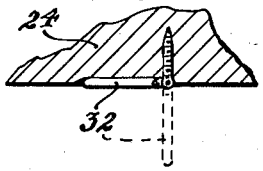
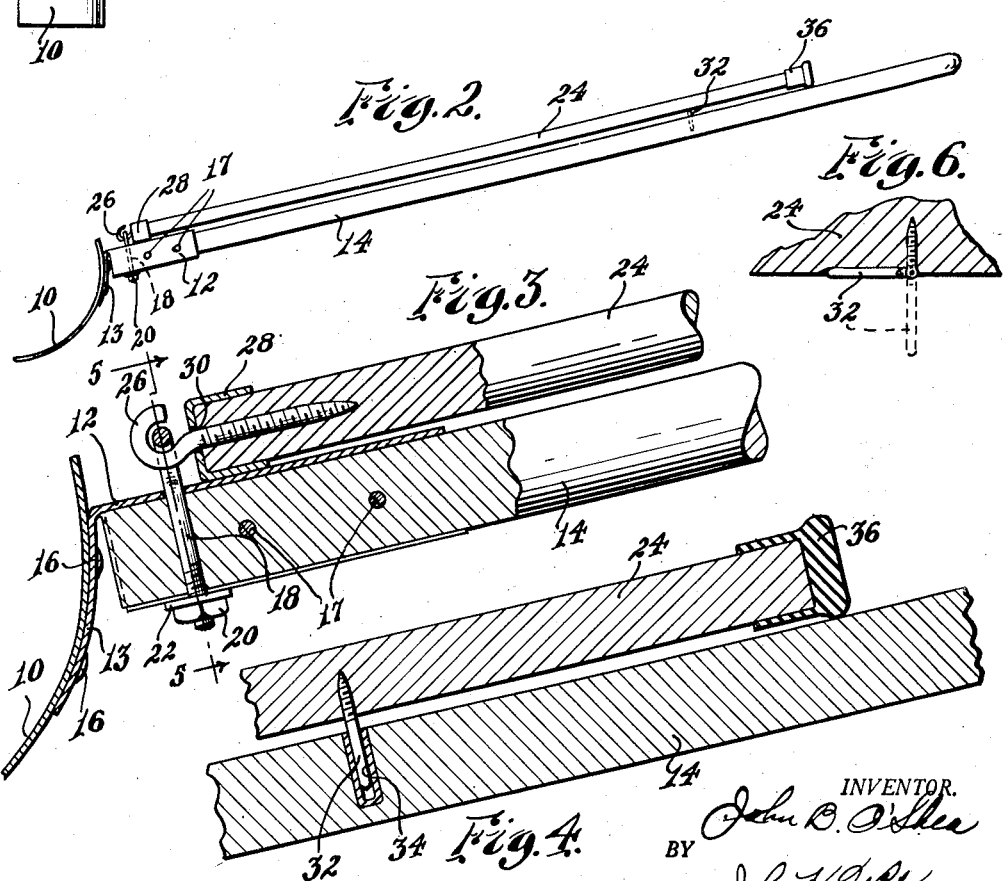
INVENTOR.
John B. O'Shea
BY John H. McKenna
Atty

United States Patent Office 2,826,835
Patented Mar. 18, 1958

2,826,835

SNOW SHOVEL

John B. O'Shea, Northampton, Mass.

Application June 11, 1953, Serial No. 360,967

3 Claims. (Cl. 37—53)

This invention relates to improvements in snow shovels, and the like. More particularly it provides an improved snow shovel of the general type which may be used as a snow pusher or plow, as well as a shovel, and which includes a readily removable auxiliary handle which may be variously positioned relative to a main handle, to facilitate snow-shoveling and snow-pushing operations.

It is among the objects of the invention to provide a snow shovel having two handles of which one is pivotally mounted on the other and movable to any of various angular relationships to said other, and is movable also into superimposed alignment with said other handle to provide a double handle which has substantially less tendency to rotate in the hands of a user. According to the invention, a main handle is rigidly connected to a scoop or pusher portion of the shovel, and one end of an auxiliary handle is pivotally and detachably connected to the main handle adjacent to the said scoop or pusher portion of the shovel and is swingable about its said pivotal connection between a position in which it extends in close general parallelism with the main handle and any of various positions in which it may extend at various angles to the main handle, at either side of the latter, there being means on the two said handles adapted to coact for holding the handles in their said close general parallelism at times when the two said handles are combined to provide a double non-round handle.

Another object of the invention is to provide a snow shovel in which an auxiliary handle is detachably connected to a main handle by a hook and eye connection about which the auxiliary handle is swingable to any of various angular relationships to the main handle, and may be maintained in superimposed parallelism with the main handle to provide a non-round double handle for the shovel.

It is, moreover, my purpose and object generally to improve the structure and effectiveness of snow shovels and more especially pusher type snow shovels having relatively movable coacting handles of which one is readily removable from the shovel.

In the accompanying drawing:

Fig. 1 is a top plan view of a snow shovel embodying features of my invention and showing two inter-connected handles in angularly related positions;

Fig. 2 is a side elevation of the shovel of Fig. 1, with the two handles parallel and super-imposed one upon the other, the shorter auxiliary handle being rotated about its axis through approximately 90° relative to the longer main handle as compared with the handles as shown in Fig. 1;

Fig. 3 is a cross-sectional view, on an enlarged scale, of the pivotally connected portions of the two handles, with the handles in their relative positions of Fig. 2;

Fig. 4 is a cross-sectional view, on the scale of Fig. 3, of the outer portions of the two handles, with the handles in their positions of Fig. 3, and showing means for maintaining the handles in their super-imposed aligned relationship;

Fig. 5 is a cross-sectional view on line 5—5 of Fig. 3, but showing the auxiliary handle detached from the main handle;

Fig. 6 is a fragmentary detail elevation showing a hinged form of pin or stud on the auxiliary handle, the fragment of the handle being in cross-section; and Fig. 7 is a view similar to Fig. 6 but showing another form of pin or stud on the auxiliary handle movable between a projecting position and a position in which its exposed part may be against and parallel to the auxiliary handle.

Referring to the drawings, a scoop-type snow shovel blade 10 may be connected in any suitable manner to a sleeve 12 within which one end portion of a relatively long handle 14 may be secured by any suitable means. The blade 10 may be variously shaped and the scoop shape as shown is merely illustrative of one of the variety of forms blade 10 may take. Similarly, the sleeve 12 may be variously formed and variously attached to blade 10 although I have found it convenient and economical to make the sleeve 12 of suitably rigid sheet metal wrapped to provide a cross-sectionally round sleeve 12 having the integral bracket part 13 for securement of sleeve 12 to blade 10, as by the rivets 16.

The end portion of handle 14 which extends within sleeve 12 may be secured therein by any suitable means, such as the rivets 17, and it becomes additionally secured by an eye-bolt 18 which extends through an upper wall portion of the sleeve and through the handle 14 with a nut 20 and washer 22 on the projecting threaded end of the eye-bolt, and with the eye of the eye-bolt disposed cross-wise of the sleeve preferably at the upper side of the latter.

One end of an auxiliary handle 24 is connected to eye-bolt 18 by means of the hook element 26 whose threaded shank is screwed into the end of auxiliary handle 24 as best seen in Fig. 3. Preferably, this end of the auxiliary handle is strengthened by having a cap 28 of metal or the like thereon with a hole 30 through its end wall for passage of the shank of hook element 26, and the hook element may serve to hold the cap on the handle or the cap may be additionally pinned to the handle. In any case, the hook element 26 will have its hook opening slightly larger than the diameter of the stock of which the eye-bolt 18 is formed, so that the auxiliary handle 24 may be hooked into the eye of the eye-bolt to effect a swivel-conneciton of auxiliary handle 24 to the main handle 14. Obviously, the auxiliary handle readily may be disconnected from the main handle whenever it may be desirable to use the shovel without the auxiliary handle.

It is a feature of the invention that the simple hook-in-eye connection of the auxiliary handle to the main handle 14, permits the auxiliary handle to be swung to either side of the main handle to constitute an angularly related handle by which the blade 10 may be pushed obliquely forwardly and to the left or forwardly and to the right, with the main handle 14 serving primarily as a steadying guide. Or, the auxiliary handle 24 may be swung forwardly to serve as a means for a person, such as a child, to draw the shovel forward as another person pushes the shovel forward by means of the main handle 14.

Also, when the shovel is to be used merely as a shovel, the auxiliary handle may be super-imposed upon the main handle 14 to provide a double handle which provides an enlarged non-round grip for the hand which facilitates the shovelling process in that the double handle has substantially less tendency to rotate within the user's hand as compared with the conventional cross-sectionally round handle. In this connection, it should be noted that means is provided for releasably maintaining the two handles in closely related parallelism, as in Fig. 1, a preferred means comprising a projecting pin or stud 32 on the auxiliary handle 24 adapted to frictionally engage in a socket or hole 34 in the main handle 14, the pin 32 desirably having substantial relatively tight extent within handle 14 to minimize the likehihood of accidental separation of the handles when the double handle is in use. A rubber cap 36, or the like, ordinarily will be provided on the outer end of auxiliary handle 24, and a comparable rubber cap or grip (not shown) may be provided on the outer end of main handle 14, if desired.

Rather than having a rigidly projecting pin or stud 32 on the auxiliary handle 24, which might cause injury or damage when the auxiliary handle is angularly related to the main handle, as in Fig. 1, the pin or stud 32 may be adjustably connected to the auxiliary handle, as in Figs. 6 or 7, to enable the pin or stud to lie against the auxiliary handle when the handles are separated. The hinged pin or stud of Fig. 6 becomes substantially rigid when thrust into the socket or hole 34 in main handle 14. The pin or stud 32 of Fig. 7 may be rotated about the axis of its threaded portion 33 to move its exposed portion 32' between its dotted position against the handle and its full line projecting position.

Various changes may be made in the details of my disclosed invention within the scope of the appended claims, and it is intended that the patent shall cover, by suitable expression in the appended claims, whatever features of patentable novelty exist in the invention disclosed.

I claim as my invention:

1. A snow scoop comprising a blade of substantially cylindrical curvature having a pair of parallel longitudinal top and bottom edges and a pair of curved transverse side edges, an integral bracket including a sleeve and an extension of the same curvature as said blade at substantially a right angle to the axis of said sleeve, said extension being riveted to said blade substantially midway between the longitudinal edges thereof with said sleeve above said extension and projecting from the blade relatively close to said top edge thereof, at a substantial elevation above said bottom edge of the blade, a relatively long main handle one end of which is fitted and secured within said sleeve, said main handle having extent in a plane generally parallel to and substantially above the general plane of the bottom edge margin of said blade, a relatively short auxiliary handle, a pivotal and detachable connection between one end of said auxiliary handle and said one end of said main handle, said connection including an eye on one of the handles and a hook on the other of said handles, said connection permitting said auxiliary handle to be swung between any of various angular relationships to said main handle and general parallelism with said main handle, said two handles when in said general parallelism constituting a manually wieldy composite handle.

2. The snow scoop of claim 1 wherein one of said handles has a socket therein and the other of said handles has a projection therefrom, said socket frictionally receiving said projection in order to secure said handles in said general parallelism.

3. The snow scoop of claim 1 wherein said eye has an integral bolt extending through said sleeve and said main handle and said one end of said auxiliary handle has a metallic cap for abutment against said eye.

References Cited in the file of this patent

UNITED STATES PATENTS

| 1,514,076 | Brown | Nov. 4, 1924 |
| 1,586,056 | Walsh | May 25, 1926 |
| 1,746,859 | Hurd | Feb. 11, 1930 |
| 2,521,441 | Bickley | Sept. 5, 1950 |
| 2,734,291 | Lasker | Feb. 14, 1956 |

FOREIGN PATENTS

| 948,860 | France | Feb. 7, 1949 |
| 973,976 | France | Sept. 20, 1950 |